(12) United States Patent
Ekberg et al.

(10) Patent No.: US 8,300,829 B2
(45) Date of Patent: Oct. 30, 2012

(54) VERIFICATION KEY HANDLING

(75) Inventors: Jan-Erik Ekberg, Vantaa (FI); Markku Kylanpaa, Helsinki (FI)

(73) Assignee: Nokia Corporation, Espoo (FI)

( * ) Notice: Subject to any disclaimer, the term of this patent is extended or adjusted under 35 U.S.C. 154(b) by 664 days.

(21) Appl. No.: 12/214,984

(22) Filed: Jun. 23, 2008

(65) Prior Publication Data

US 2009/0316908 A1    Dec. 24, 2009

(51) Int. Cl.
*H04L 9/08* (2006.01)

(52) U.S. Cl. ......... 380/278; 713/156; 713/176; 713/189

(58) Field of Classification Search ................ 380/278; 713/156

See application file for complete search history.

(56) References Cited

U.S. PATENT DOCUMENTS

| | | | | |
|---|---|---|---|---|
| 5,978,484 | A * | 11/1999 | Apperson et al. | 705/54 |
| 6,976,163 | B1 | 12/2005 | Hind et al. | 713/156 |
| 2005/0138393 | A1 * | 6/2005 | Challener et al. | 713/186 |
| 2005/0223219 | A1 | 10/2005 | Gatto et al. | 713/156 |

OTHER PUBLICATIONS

TCG Mobile Reference Architecture, version 1.0, revision 1, Jun. 12, 2007, Trusted Computing Group, Inc.
TCG Mobile Trusted Module Specification, version 1.0, revision 1, Jun. 12, 2007, Trusted Computing Group, Inc.
Jansen Wa "Determining privileges of mobile agents" In: Computer Security Applications Conference, 2001, ACSAC 2001, Proceedings 17th Annual Dec. 10-14, 2001, ISBN978-0-7695-1405-5, pp. 149-158, abstract, chapter 2 "Overview".
Hassinen et al, "Client controlled security for web applications" In: Local Computer Networks, 2005. 30th Anniversary. IEEE Conference on Sydney, Australia Nov. 15-17, 2005, ISBN978-0-7695-2421-4, pp. 810-816, especially chapter III "Solution".
"On the Deployment of Mobile Trusted Modules", Andreas U. Schmidt, et al., IEEE 2008, pp. 3169-3174.
"Mobile Trusted Module (MTM)—an introduction", Jan-Erik Ekberg et al., Nokia Research Center, NRC-TR-2007-015, Nov. 2007, 13 pgs.
"A Platform for OnBoard Credentials", N. Asokan et al., Financial Cryptography and Data Security, ISBN: 978-3-540-85229-2, Jan. 2008, 3 pgs.

* cited by examiner

*Primary Examiner* — Cordelia Zecher
(74) *Attorney, Agent, or Firm* — Harrington & Smith (57) ABSTRACT

A method, an apparatus, and a computer program product for enabling verification key handling is disclosed. Said handling is enabled by receiving a verification key including an identifier of the parent verification key of the verification key, wherein the verification key includes a constraint portion, determining whether the constraint portion of the verification key corresponds to the constraint portion of the parent verification key, associating, in case the constraint portion of the verification key corresponds to the constraint portion of the parent verification key, the verification key with a particular state update, and storing the verification key associated with the particular state update.

23 Claims, 5 Drawing Sheets

FIG. 5

VERIFICATION KEY HANDLING

FIELD OF THE INVENTION

The invention relates in general to trusted computing, and in particular, though not exclusively, to verification key handling in trusted computing.

BACKGROUND OF THE INVENTION

Today's mobile phones typically serve as computing platforms for software and firmware that is supplied by a number of vendors. For example, a device manufacturer supplies the device with software and/or firmware that enables the operation of different components of the device, such as the radio interface and smart card reader modules, while an application processor manufacturer supplies the software and firmware related to the operation of the application processor. Furthermore, an operating system and user applications may be supplied by one or more software vendors.

There are factors that impose strict requirements on the security and integrity protection of the mobile computing platform and/or software and firmware run on the platform. For example, usage of radio frequencies is highly regulated by authorities. Another example is the prevention of device hijacking so that the mobile device cannot be used anonymously for malicious purposes. This means, that a mobile device operating as a computing platform needs to be able to control the operation of software running on the mobile device such that e.g. unauthorized modification of radio configuration parameters can be prevented.

The requirement of trusted computing on a mobile device has been addressed e.g. by the introduction of the mobile trusted module concept by Trusted Computing Group. In said concept, e.g. modifications to system configuration parameters may be controlled by a mobile trusted module that itself runs in a secure computing environment provided by the mobile device. Modifications to e.g. system configuration parameters and parameters representing a particular state of a computer program module may be made by using Reference Integrity Metrics (RIM) certificates. The RIM certificates requesting modifications to configuration and state parameters may be signed by verification keys issued e.g. by the mobile trusted module to parties that are authorized to make said modifications. If a party is in possession of a properly issued and validated verification key, said party may be able to authorize any state change on the mobile device, including those the modification of which may compromise device security or cause the mobile device to operate against regulations. In other words, the authorization enjoyed by a holder of a proper verification key may not be appropriately limited in current mobile computing platforms.

SUMMARY

The invention aims at addressing at least some of the issues discussed above. According to a first aspect of the invention there is provided a method comprising the steps of receiving a verification key including an identifier of the parent verification key of the verification key, wherein the verification key comprises a constraint portion, determining whether the constraint portion of the verification key corresponds to the constraint portion of the parent verification key, associating, in case the constraint portion of the verification key corresponds to the constraint portion of the parent verification key, the verification key with a particular state update, and storing the verification key associated with the particular state update.

According to a second aspect the invention provides an apparatus comprising a processor configured to receive a verification key including an identifier of the parent verification key of the verification key, the verification key comprising a constraint portion, determine whether the constraint portion of the verification key corresponds to the constraint portion of the parent verification key, and to associate the verification key with a particular state update, the apparatus further comprising a memory configured to store the verification key associated with the particular state update.

According to a third aspect there is provided a computer program product embodied on a computer-readable medium, the computer program comprising program code operable to be loaded into the memory of and executed on a computing apparatus, the program code having been configured to enable, when executed, the computing apparatus to receive a verification key including an identifier of the parent verification key of the verification key, wherein the verification key comprises a constraint portion, determine whether the constraint portion of the verification key corresponds to the constraint portion of the parent verification key, associate, in case the constraint portion of the verification key corresponds to the constraint portion of the parent verification key, the verification key with a particular state update, and to store the verification key associated with the particular state update.

According to a fourth aspect the invention provides an apparatus comprising means for receiving a verification key including an identifier of the parent verification key of the verification key, the verification key comprising a constraint portion, means for determining whether the constraint portion of the verification key corresponds to the constraint portion of the parent verification key, means for associating the verification key with a particular state update, and means for storing the verification key associated with the particular state update.

Various exemplary embodiments of the invention are illustrated hereinafter in the detailed description of the invention as well as in the dependent claims appended hereto. The embodiments are illustrated with reference to selected aspects of the invention. A person skilled in the art appreciates that any embodiment of the invention may apply to other aspects as well either alone or in combination with other embodiments.

BRIEF DESCRIPTION OF THE DRAWINGS

The invention will be described, by way of example only, with reference to the accompanying drawings, in which.

DETAILED DESCRIPTION

In the following description, like numbers denote like elements.

Figure 1:
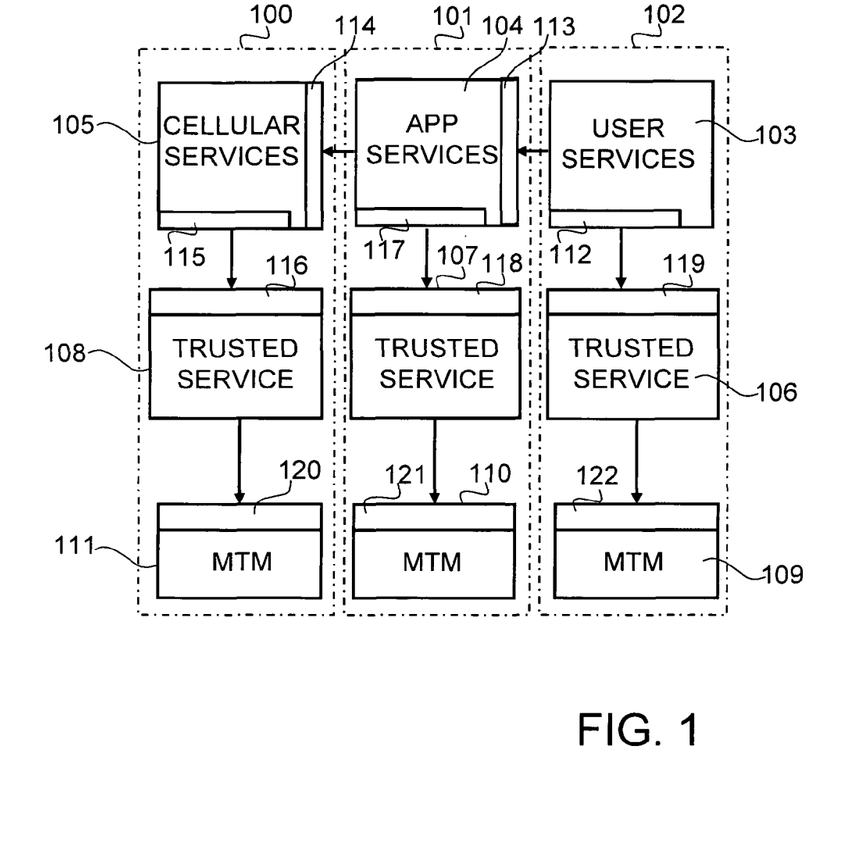
FIG. 1 shows a general overview of a trusted mobile platform on which an embodiment of the invention may be implemented.

Reference is made to FIG. 1, which depicts a general overview of a trusted mobile platform on which an embodiment of the invention may be implemented. FIG. 1 shows three engines 100, 101, 102. Each engine may comprise a dedicated processor or a run-time environment that has access to trusted resources. Each engine may run both trusted services and normal services. Trusted services are services that are instantiated by using and modifying trusted resources of a computing device, such as a mobile phone. Trusted resources are resources, whose integrity can be verified e.g. by using an authentication key.

The engine 100 of FIG. 1 may be configured to provide cellular services, such as cellular protocol stacks required for an access to a mobile communication network, to the application services engine 101 via an interface 114. The cellular services engine 100 may comprise a conventional cellular services module 105, a trusted services module 108, and a mobile trusted module 111. The cellular services module may use the services of the trusted services module 108 via the application programming interfaces (APIs) 115 and 116, and the mobile trusted services module 108 may in turn access the services of the mobile trusted module 111 via the interface 120.

The application services engine 101 of FIG. 1 may be configured to provide application services, such as a phone book application service, for the user service engine 102 via an interface 113. The application service engine 101 may comprise an application service module 104, a trusted service module 107, and a mobile trusted module 110. The application service module 104 may access the services of the trusted service module 107 via the APIs 117 and 118, and the trusted service module 107 may in turn access the services of the mobile trusted module 110 via the API 121.

The user services engine 102 may comprise a conventional user service module 103, such as web browser application, a trusted service module 106, and a mobile trusted platform module 109. The user service module 103 may access the services of the trusted service module 106 via the interfaces 112 and 119, and the trusted service module 106 may access the services of the mobile trusted module 109 via the interface 122.

Each of the engines 100, 101, 102, which may be trusted engines, may be implemented in hardware, software, firmware, or a combination thereof. The trusted service modules 106, 107, 108 may make measurements of the configuration and functions of the conventional service modules 103, 104, 105, and store the measurements in the mobile trusted modules 109, 110, 111, respectively.

Figure 2:
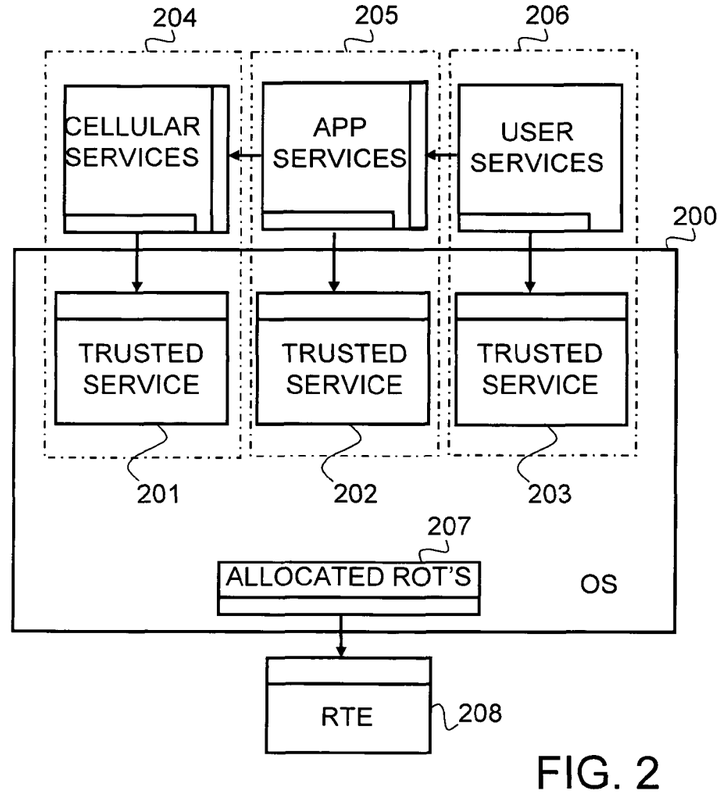
FIG. 2 shows another general overview of a trusted mobile platform on which an embodiment of the invention may be implemented.

Reference is now made to FIG. 2, which shows another general overview of a trusted mobile platform on which an embodiment of the invention may be implemented. FIG. 2 shows engines 204, 205, 206 corresponding to the engines 100, 101, 102 of FIG. 1. FIG. 2 further shows an operating system 200 of a computing device, and trusted service modules 201, 202, 203 corresponding to the trusted service modules 108, 107, 106 of FIG. 1, respectively. In the platform of FIG. 1, the trusted service modules 201, 202, 203 have been implemented as services of the operating system 200. FIG. 2 further shows allocated Roots of Trust modules 207 and a Root of Trust for Enforcement (RTE) module 208.

The engines 204, 205, 206 may be trusted engines that are initiated by using secure startup, or secure boot. The secure startup of the engines may use the bootstrap method, where a startup of bootstrapped modules starts with the initiation of a module, the integrity of which is secured by the computing platform e.g. by storing the first module in the bootstrap chain in a secure memory location. Once the first module is up and running, it starts and verifies the next module in the bootstrapped secure boot chain.

The allocated Roots of Trust modules 207 of FIG. 2 may comprise a Root of Trust for Storage (RTS) module, a Root of Trust for Verification (RTV) module, and a Root of Trust for Reporting (RTR) module. The Root of Trust for Enforcement (RTE) module 207, in combination with at least some of the allocated Roots of Trust modules 207 may be used to setup a secure computing environment for a mobile trusted module to load and initialize. The secure computing environment may be e.g. a processor memory. In FIG. 2, the operating system 200 may provide a compartmentalized secure execution environment, including processing and storage resources, as well as an instance of a mobile trusted module for each of the trusted engines 204, 205, 206.

The concepts of mobile trusted module and trusted mobile platform have been described in detail e.g. in the specifications TCG Mobile Trusted Module Specification, version 1.0 of 12 Jun. 2007 and TCG Mobile Reference Architecture, version 1.0 of 12 Jun. 2007 of the Trusted Computing Group.

Figure 3:
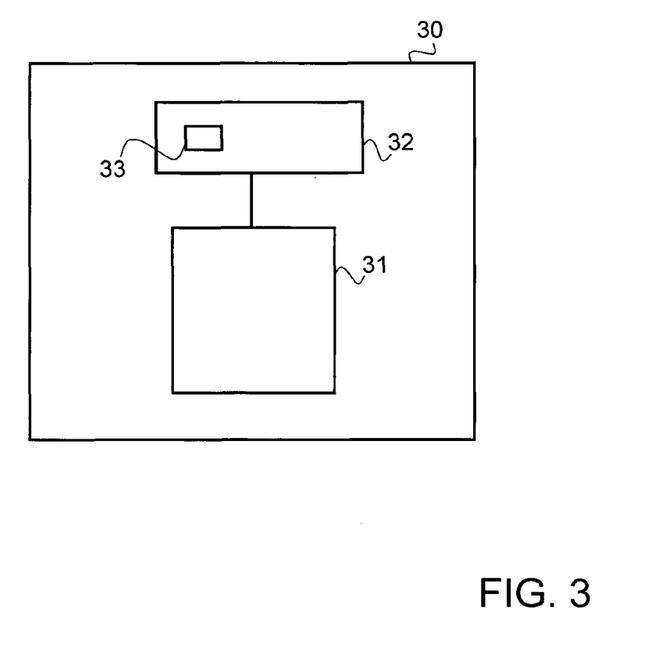
FIG. 3 shows an outline of an apparatus on which an embodiment of the invention may be implemented.

Reference is now made to FIG. 3, which shows an outline of an apparatus 30 on which an embodiment of the invention may be implemented. The apparatus 30 of FIG. 3 comprises a processor 31 and a memory 32. FIG. 3 further shows a computer program 33 stored in the memory 32, that represents an example of a computer-readable medium and operable to be loaded into and executed on the processor 31.

The processor 31 may be e.g. a central processing unit (CPU), a microprocessor, a digital signal processor (DSP), a graphics processing unit, or the like. FIG. 3 shows one processor 31, but the apparatus 30 may comprise a plurality of processors. The apparatus 30 may e.g. comprise a baseband processor and an application processor.

The memory 32 may be for example a non-volatile or a volatile memory, such as a read-only memory (ROM), a programmable read-only memory (PROM), erasable programmable read-only memory (EPROM), a random-access memory (RAM), a flash memory, a data disk, an optical storage, a magnetic storage, a memory or smart card, such as a SIM or USIM card, or the like. The apparatus 30 may comprise a plurality of memories 32. The memory 32 may be constructed as a part of the apparatus 30 or the processor 31, or it may be inserted into a slot, port, or the like of the apparatus 30 by a user. The memory 32 may serve the sole purpose of storing data, or it may be constructed as a part of an apparatus serving other purposes, such as processing data.

Figure 4:
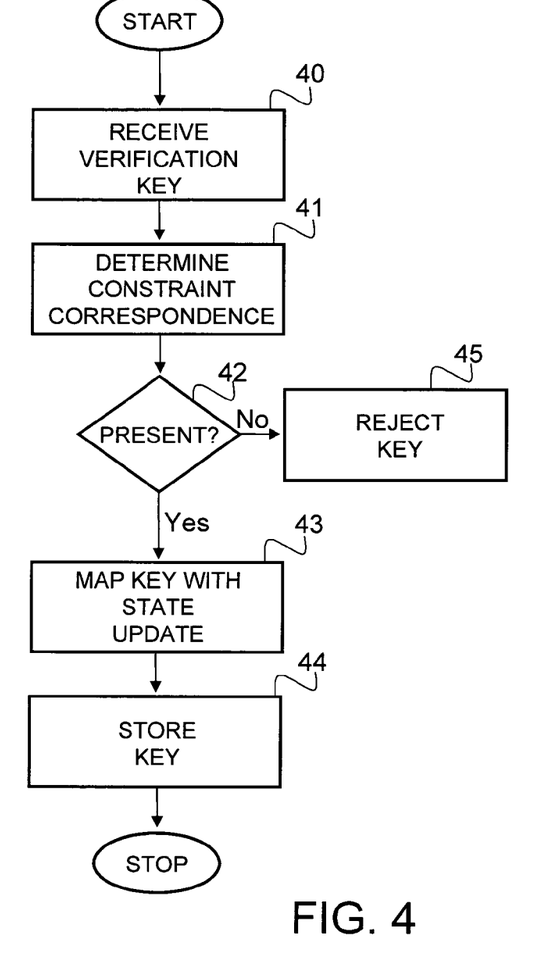
FIG. 4 depicts an example of a method according to an embodiment of the invention.

Reference is now made to FIG. 4, which depicts an example of a method according to an embodiment of the invention. In step 40, a verification key is received. The verification key may be received e.g. by a mobile trusted module, such as the mobile trusted modules 109, 110, 111 of FIG. 1. The mobile trusted module may e.g. be represented by the computer program 33 of FIG. 3. The verification key may be e.g. a verification key used for authorizing and integrity-protecting Reference Integrity Metrics (RIM) certificates that in turn are used for conveying and/or modifying Platform Configuration Register (PCR) values that represent a particular state of e.g. a software module during system startup. Typically, a RIM certificate contains an expected value of a state or configuration parameter, and RIM certificates may also be used to effect state transitions. RIM certificates and use thereof are further discussed in the TCG Mobile Trusted Module and Mobile Reference Architectures.

If the verification key received in step 40 of FIG. 4 comprises a constraint portion, it is determined in step 41, whether the constraint portion of the received verification key corresponds to the constraint portion of the verification key's parent verification key.

If the received verification key is to be part of a verification key hierarchy, the verification key typically comprises an indication of the parent verification key of the verification key. A mobile trusted module that receives the verification key for the purpose of establishing a hierarchy of verification keys may use the indication for identifying the parent verification key of the received verification key. The constraint portion of the verification key may comprise a set of allowed state updates that determine the particular state update. The set of allowed state updates may comprise at least one platform configuration register. The constraint portion of the verification key may impose restrictions on the use of the verification key for authorizing RIM certificates. For example, the constraint portion may indicate, that a RIM certificate signed with the verification key may be used only for authorizing a particular state transition during a secure boot process. If the verification key is used for signing a RIM certificate that is tried to be used to modify a state that is not indicated by the constraint portion, the modification may not be authorized by a mobile trusted module. The indication of the allowed state transitions may be e.g. in the form of PCR values, the modification of which may be authorized by the verification key in question.

The constraint portion of the verification keys may be utilized to implement a hierarchy of verification keys, wherein the extent of the authorization power of a verification key is limited to the extent of the authorization power of the parent verification key, or the child key may have a narrower power to authorize RIM certificates and state updates. For example, a parent key may comprise a constraint portion that indicates, that the parent key may be used to authorize updates to the values of PCRs 10 to 20. A child key of said parent key may in turn comprise a constraint portion, that has a matching constraint portion, i.e. the constraint portion of the child key indicates, that the child key can also be used to authorize modifications of PCRs 10 to 20. Another child key of said parent key may comprise a constraint portion that indicates, that the other child key may be used for authorizing the modification of PCRs 15 to 20, for example.

If said hierarchy of constrained trust is established within a mobile trusted module, the mobile trusted module may determine, in step 41 of FIG. 4, that the constraint portion of the received verification key corresponds to the constraint portion of the parent verification key, i.e. the constraint portion of the child verification key matches or is a subset of the constraint portion of the parent verification key. If the result of the determination (step 42) is that the constraint portion of the child verification key does not correspond to the constraint portion of the parent verification key, the mobile trusted module may reject the received verification key in step 45.

If, in step 42, the mobile trusted module determines that the constraint portion of the received verification key corresponds to the constraint portion of the parent verification key in a manner described hereinbefore, the mobile trusted module may register, in step 43, an association between the received verification key and a particular state update. The mobile trusted module may e.g. maintain such registrations in a table or the like stored e.g. in the memory 32 of the apparatus 30 of FIG. 3. Once an association has been registered, the registered verification key may be used for authorizing a state transition/update associated with the verification key.

The integrity of the compartment of the memory 32, where the verification keys and/or the registered associations are stored, may be secured by a Root of Trust for Storage (RTS) module.

If the parent key of the verification key received in step 40 is the root key of the verification key hierarchy, the received key is compared against the root key. A mobile trusted module may receive the root key, for example a Root Verification Authority Identifier (RVAI) described in the TCG specifications referred to hereinbefore, in a suitable manner during the instantiation of the mobile trusted module in a secure boot process.

The received verification key may also comprise a signature portion, and the received verification key may have been signed using the parent verification key. The received verification key may be further validated by checking the signature in the received verification key against the parent verification key.

Figure 5:
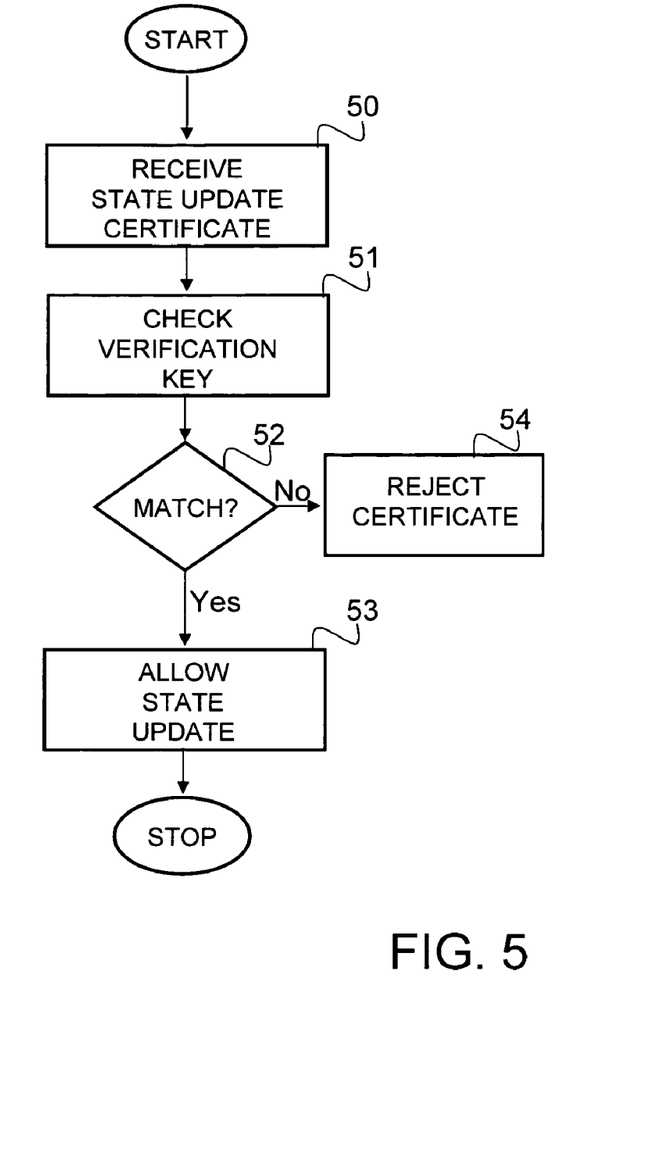
FIG. 5 shows another example of a method according to an embodiment of the invention.

Reference is now made to FIG. 5, which shows another example of a method according to an embodiment of the invention. In step 50, a state update certificate is received. The state update certificate may be received e.g. by a mobile trusted module, such as the mobile trusted modules 109, 110, 111 of FIG. 1. The mobile trusted module may be e.g. represented by the computer program 33 of FIG. 3. The state update certificate may be e.g. a Reference Integrity Metrics (RIM) certificate that is used for conveying and/or modifying Platform Configuration Register (PCR) values that represent a particular state of e.g. a software module during system startup. Typically, a RIM certificate contains an expected value of a state or configuration parameter, and RIM certificates may also be used to effect state transitions. RIM certificates and use thereof are discussed in detail in the TCG specifications referred to hereinbefore.

The state update certificate received in step 50 may request a particular state update, and it may have been signed with a request verification key. In step 51 it is determined whether the request verification key corresponds to a stored verification key that has been associated with the particular state update requested by the received state update certificate. For example, in step 51 a mobile trusted module may compare the request verification key against a verification key that the mobile trusted module has received, stored, and associated with a particular state transition/update in a manner described hereinbefore. The request verification key may comprise a constraint portion that determines the type of state update certificates that can be validated using the request verification key. For example, the constraint portion may restrict the use of the request verification key to validating a state update certificate that requests state updates determined by the constraint portion of the request verification key. Other state update certificates may not be validated by said request verification key. For example, the constraint portion may restrict the validation of a state update certificate, e.g. a RIM certificate, such that the request verification key can only be used for validating state update certificates that request a change to platform configuration register(s) allowed by the constraint portion.

If the request verification key matches (step 52) a stored verification key, the requested state update is allowed in step 53. If the keys do not match, the state update certificate is rejected in step 52. For example, a mobile trusted module may allow a particular modification of PCR values that the mobile trusted module stores and maintains, according to a received RIM certificate, if the RIM certificate has been signed with a verification key that the mobile trusted module has associated with said particular modification of PCR values.

The requested state update may relate to a transition from one state to another state of a system during a secure startup or boot. The state update certificate received in step 50 of FIG. 5 may represent an allowed or expected state of e.g. a computer program module during the secure startup. The expected state or configuration of the computer program module may be e.g. the version of the computer program module.

The method, apparatus, and computer program described herein may be used e.g. for ensuring that a correct version of a computer program module is loaded during a secure boot. The method, apparatus, and computer program may be further used to limit the parties that are allowed to authorize the load and execution of a computer program module and/or a particular version of the module. For example, the kernel of an operating system may be loaded into a secure computing environment under the control of a mobile trusted module. The mobile trusted module may control that a component that is loaded prior to the loading of the OS kernel does not load a wrong version of the OS kernel during startup.

The foregoing description has provided by way of non-limiting examples of particular implementations and embodiments of the invention a full and informative description of the best mode presently contemplated by the inventors for carrying out the invention. It is however clear to a person skilled in the art that the invention is not restricted to details of the embodiments presented above, but that it can be implemented in other embodiments using equivalent means without deviating from the characteristics of the invention.

Furthermore, some of the features of the above-disclosed embodiments of this invention may be used to advantage without the corresponding use of other features. As such, the foregoing description shall be considered as merely illustrative of the principles of the present invention, and not in limitation thereof. Hence, the scope of the invention is only restricted by the appended patent claims.

We claim:

1. A method comprising:
   receiving, at a device, a verification key including an identifier of a parent verification key of the verification key, wherein the verification key comprises a constraint portion;
   determining, at the device, whether the constraint portion of the verification key matches a subset of a constraint portion of the parent verification key, the subset being less than all of the constraint portion of the parent verification key;
   associating, by the device, in case the constraint portion of the verification key matches the subset of the constraint portion of the parent verification key, the verification key with a particular state update; and
   storing, by the device, the verification key associated with the particular state update.

2. The method according to claim 1, wherein the verification key further comprises a signature and wherein the method further comprises: validating the verification key by comparing the signature included in the verification key with the parent verification key.

3. The method according to claim 1, wherein the matched subset is utilized to implement a hierarchy of the verification key in relation to the parent verification key, and wherein at least an authorization capability of the verification key is limited based on the implemented hierarchy.

4. The method according to claim 3, wherein the authorization capability of the verification key is limited, based on the implemented hierarchy, to authorize a modification of only certain platform configuration registers and not others.

5. The method according to claim 1, wherein the constraint portion further comprises a set of allowed state updates that determine the particular state update.

6. The method according to claim 5, wherein the set of allowed state updates comprises at least one platform configuration register.

7. The method according to claim 1, further comprising:
   receiving a state update certificate requesting the particular state update, the state update certificate having been signed with a request verification key;
   determining whether the request verification key corresponds to the stored verification key associated with the particular state update; and
   allowing the particular state update, in case the request verification key corresponds to the stored verification key associated with the particular state update.

8. The method according to claim 7, wherein the particular state update comprises a transition of a system from a first state to a second state during a secure startup of the system.

9. The method according to claim 8, wherein the state update certificate represents an allowed state during the secure startup of the system.

10. The method according to claim 9, wherein the state update certificate comprises a reference integrity metric certificate.

11. The method according to claim 7, wherein the request verification key comprises a constraint portion that determines a type of state update certificate that can be validated using the request verification key.

12. The method according to claim 1, wherein the constraint portion of the parent verification key is associated with authorization to update values of a set of platform configuration registers, and wherein the constraint portion of the verification key indicates authorization to update values of a subset of the set of platform configuration registers.

13. An apparatus comprising:
    at least one processor; and
    at least one memory including computer program code, where the at least one memory and the computer program code are configured, with the at least one processor, to cause the apparatus to at least:
    receive a verification key including an identifier of a parent verification key of the verification key, the verification key comprising a constraint portion;
    determine whether the constraint portion of the verification key matches a subset of a constraint portion of the parent verification key, the subset being less than all of the constraint portion of the parent verification key; and
    associate the verification key with a particular state update; and
    store the verification key associated with the particular state update.

14. The apparatus according to claim 13, wherein the verification key further comprises a signature and wherein the at least one memory including computer program code is configured, with the at least one processor, to cause the apparatus to: validate the verification key by comparing the signature included in the verification key with the parent verification key.

15. The apparatus according to claim 13, wherein the at least one memory including computer program code is configured, with the at least one processor, to cause the apparatus to utilize the matched subset to implement a hierarchy of the verification key in relation to the parent verification key, wherein at least an authorization capability of the verification key is limited based on the implemented hierarchy.

16. The apparatus according to claim 13, wherein the authorization capability of the verification key is limited, based on the implemented hierarchy, to authorize a modification of only certain platform configuration registers and not others.

17. The apparatus according to claim 13, wherein the at least one memory including computer program code is configured, with the at least one processor, to cause the apparatus to:
   receive a state update certificate requesting the particular state update, the state update certificate having been signed with a request verification key;
   determine whether the request verification key corresponds to the stored verification key associated with the particular state update; and
   allow the particular state update, in case the request verification key corresponds to the stored verification key associated with the particular state update.

18. A non-transitory computer-readable medium embodying a computer program product, the computer program comprising program code operable to be loaded into the memory of and executed on a computing apparatus, the program code having been configured to enable, when executed, the computing apparatus to:
   receive a verification key including an identifier of a parent verification key of the verification key, wherein the verification key comprises a constraint portion;
   determine whether the constraint portion of the verification key matches a subset of a constraint portion of the parent verification key, the subset being less than all of the constraint portion of the parent verification key;
   associate, in case the constraint portion of the verification key matches the subset of the constraint portion of the parent verification key, the verification key with a particular state update; and
   store the verification key associated with the particular state update.

19. The apparatus according to claim 13, wherein the constraint portion of the parent verification key is associated with authorization to update values of a set of platform configuration registers, and wherein the constraint portion of the verification key indicates authorization to update values of a subset of the set of platform configuration registers.

20. The non-transitory computer readable medium according to claim 18, wherein the verification key further comprises a signature and wherein the program code is further configured to enable the computing apparatus to: validate the verification key by comparing the signature included in the verification key with the parent verification key.

21. The non-transitory computer readable medium according to claim 18, wherein the program code is further configured to enable the computing apparatus to:
   receive a state update certificate requesting the particular state update, the state update certificate having been signed with a request verification key;
   determine whether the request verification key corresponds to the stored verification key associated with the particular state update; and
   allow the particular state update, in case the request verification key corresponds to the stored verification key associated with the particular state update.

22. The non-transitory computer-readable medium according to claim 18, wherein the matched subset is utilized to implement a hierarchy of the verification key in relation to the parent verification key, and wherein at least an authorization capability of the verification key is limited based on the implemented hierarchy.

23. The non-transitory computer readable medium according to claim 18, wherein the constraint portion of the parent verification key is associated with authorization to update values of a set of platform configuration registers, and wherein the constraint portion of the verification key indicates authorization to update values of a subset of the set of platform configuration registers.

* * * * *